H. P. KRAFT & M. C. SCHWEINERT.
TIRE VALVE.
APPLICATION FILED MAR. 11, 1910.
1,174,168. Patented Mar. 7, 1916.
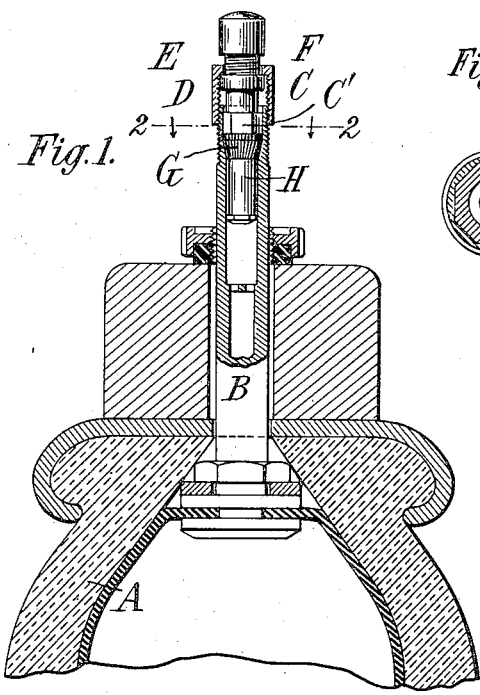
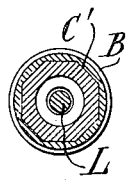
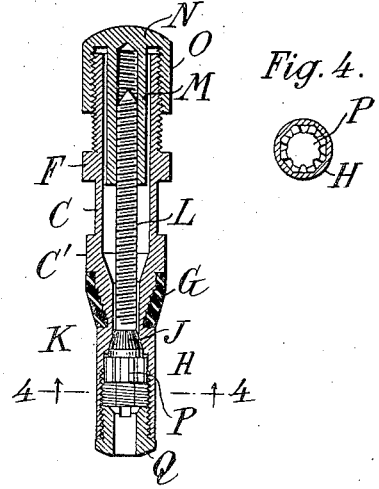
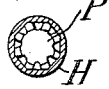
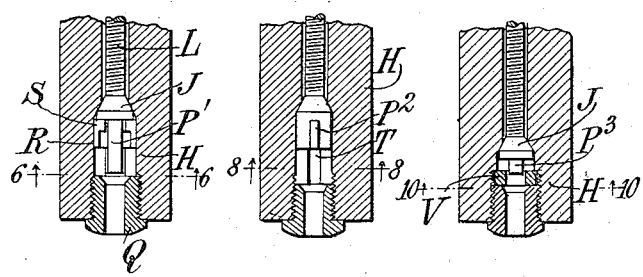
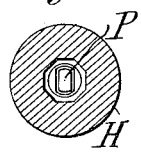
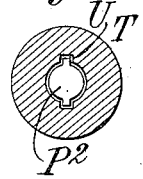
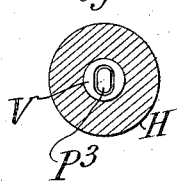
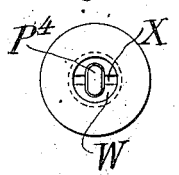
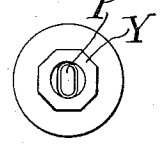
WITNESSES:
Fred White
René Bruine
INVENTORS:
Henry P. Kraft and
Maximilian Charles Schweinert,
By Attorneys,
Arthur C. Fraser & Usina

UNITED STATES PATENT OFFICE.

HENRY P. KRAFT, OF NEW YORK, N. Y., AND MAXIMILIAN CHARLES SCHWEINERT, OF WEST HOBOKEN, NEW JERSEY.

TIRE-VALVE.

1,174,168.     Specification of Letters Patent.     Patented Mar. 7, 1916.

Application filed March 11, 1910. Serial No. 548,725.

*To all whom it may concern:*

Be it known that we, HENRY P. KRAFT, residing in the borough of Brooklyn, county of Kings, city and State of New York, and MAXIMILIAN CHARLES SCHWEINERT, residing in West Hoboken, in the county of Hudson and State of New Jersey, both citizens of the United States, have jointly invented certain new and useful Improvements in Tire-Valves, of which the following is a specification.

This invention aims to provide certain improvements in the type of valves generally applied to pneumatic tires for inflating them, and provides a valve the inside parts of which are very easily accessible at the same time that they are protected from accidental injury when withdrawn from the outer shell.

The improvement provides certain other advantages referred to in detail hereinafter.

The accompanying drawings illustrate embodiments of the invention.

Figure 1 is a longitudinal section through a tire and the outer shell of a valve, showing the valve casing in elevation. Fig. 2 is a cross-section of the same on the line 2—2. Fig. 3 is a longitudinal section of the valve casing with the central parts in elevation. Fig. 4 is a section on the line 4—4 of the same. Figs. 5, 7, 9, 11 and 13 are longitudinal sections of other constructions. Figs. 6, 8 and 10 are sections on the corresponding lines of Figs. 5, 7 and 9. Figs 12 and 14 are underside plan views of Figs. 11 and 13.

Referring to the embodiments of the invention illustrated the valve is connected to the tire A through an outer shell B fastened thereto in the usual way, and in the outer end of which is carried the valve casing C. The outer end of the shell B is internally of octagonal or other non-circular shape and the valve casing C has a portion C' of the same shape externally and adapted to fit closely into said socket and thus prevent rotation of the valve casing in the outer shell. The valve casing is fastened in place by means of a ring D screwing on the outside of the outer shell and having an inwardly projecting flange at its upper end overhanging the shoulder F on the valve casing. Below the octagonal portion C' of the valve casing the latter is tapered and provided with a tapered rubber washer or packing ring G fitting a correspondingly tapered face in the bottom of the socket so as to make a tight joint when the ring G is screwed down. Below the packing ring G the valve casing has a cylindrical extension H fitting easily into the cylindrical portion of the shell, providing a simple construction of the outer shell and at the same time protecting the internal mechanism of the valve against injury when the valve casing is withdrawn from the shell.

The valve proper J is conical and closes outward against the inner face of a conical seat K provided within the valve casing. A threaded stem L projects outward through the seat K into the upper part of the valve casing where it is within reach of a nipple M extending inward from a cap N which preferably is provided with an outer flange O surrounding the upper end of the valve casing. The nipple M is internally threaded to fit the valve stem L so that by screwing the cap inward upon the stem L until the cap gets into engagement with the upper edge of the valve casing, the stem may be drawn outward with sufficient force to secure a good pressure of the valve proper on its seat. Or, supposing the cap removed, the valve may be pressed open to deflate the tire by simply pressing the end of the nipple upon the end of the valve stem without screwing the cap. In the construction illustrated the pressure of air within the tire is depended upon to hold the valve closed with a moderate pressure during the inflating operation and until the cap is applied to force the valve and hold it positively against its seat.

Means are provided for holding the valve stem L against rotation so as to permit the pulling of it outward by the screwing operation of the cap described, such means being located upon the inner side of the valve proper so that the valve with its stem may be withdrawn through the inner end of the valve casing; additional means being provided for holding the valve proper and stem in the casing normally. In Fig. 3, for example, the fixity of the valve stem against rotation is determined by forming the lower part H of the valve casing of octagonal shape and by forming an extension P on the inner side of the valve proper, the face of which is shaped similarly to that of the portion H of the casing so as to prevent rotation of the valve. The lower end of the valve casing, after the valve is in place, is stopped with an end $q$ having a projecting octagonal edge so that it can be unscrewed and withdrawn by hand. The nut Q is provided with a central aperture for the passage of air, and the side faces of the extension P are grooved for the same purpose.

In the construction shown in Figs. 5 and 6 the rotation of the valve stem L is prevented by means of a flattened extension P' passing through a sleeve R having an octagonal outer face fitting the similarly shaped inner face of the extension H of the valve casing, and having at its inner end a flange S with an aperture of the same shape as the extension P' of the valve. The accidental escape of these parts is prevented by means of a nut Q as in Fig. 3.

In the construction shown in Figs. 7 and 8 the valve is provided with an extension $P^2$ having longitudinal flanges T thereon fitting in similar grooves U formed in the extension H of the casing.

In the construction shown in Figs. 9 and 10 the valve is provided with a short flat extension $P^3$ fitting in a similarly shaped opening in a ring V which is forced into the extension H of the casing so as to frictionally oppose the rotation of the ring and the valve.

In the construction of Figs. 11 and 12 an extension $P^4$ is provided of flat shape and passing through a similarly shaped opening into the nut W which is screwed into the threaded end of the casing extension H so as to be flush therewith and prevent more securely any accidental withdrawal, the withdrawal and insertion of the nut being effected by a screw-driver in engagement with the slot X in the end thereof. In the construction shown in Figs. 13 and 14 the same flattened extension $P^4$ is used. The nut Y is provided with a similar opening through which the extension passes, and is provided with a head extending laterally over the end of the casing extension H and provided with an octagonal face by which it can be screwed down upon the end of the casing with sufficient force to prevent its being turned unintentionally.

What we claim is:—

1. A pneumatic tire valve comprising a valve casing, an outer shell having a polygonal socket, said valve casing being separable from, and having a polygonal portion fitting in, said socket to prevent rotation thereof, and means for holding said valve casing and shell in engagement.

2. A pneumatic tire valve having a valve casing, a seat therein, a valve proper seating on an inner face of said seat, a threaded valve stem projecting outward through said seat, a cap having a threaded portion adapted to engage said stem for drawing the valve outward against its seat, said casing having an extension H below said valve and an angular inner face, an extension P on the inner side of said valve having an angular cross-section, non-rotatively engaging the inner face of said casing extension H, but longitudinally movable therein, and removable means for preventing the escape of said valve extension from the inner end of said casing extension, said extension P having interior dimensions large enough to admit said valve from the lower end.

In witness whereof, we have hereunto signed our names in the presence of two subscribing witnesses.

HENRY P. KRAFT.
MAXIMILIAN CHARLES SCHWEINERT.

Witnesses:
EUGENE V. MYERS,
FRED WHITE.

Copies of this patent may be obtained for five cents each, by addressing the "Commissioner of Patents, Washington, D. C."